US011888181B2

(12) United States Patent
Lee et al.

(10) Patent No.: US 11,888,181 B2
(45) Date of Patent: Jan. 30, 2024

(54) BATTERY PACK INCLUDING INSULATING TUBE

(71) Applicant: LG CHEM, LTD., Seoul (KR)

(72) Inventors: Hyun-Jong Lee, Daejeon (KR); Choon-Kwon Kang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 1 day.

(21) Appl. No.: 16/969,786

(22) PCT Filed: Dec. 12, 2019

(86) PCT No.: PCT/KR2019/017601
§ 371 (c)(1),
(2) Date: Aug. 13, 2020

(87) PCT Pub. No.: WO2020/145531
PCT Pub. Date: Jul. 16, 2020

(65) Prior Publication Data
US 2021/0066685 A1 Mar. 4, 2021

(30) Foreign Application Priority Data
Jan. 10, 2019 (KR) .................. 10-2019-0003390

(51) Int. Cl.
H01M 50/529 (2021.01)
H01M 50/116 (2021.01)
(Continued)

(52) U.S. Cl.
CPC ....... H01M 50/529 (2021.01); H01M 50/116 (2021.01); H01M 50/213 (2021.01);
(Continued)

(58) Field of Classification Search
CPC .. H01M 50/20; H01M 50/529; H01M 50/116; H01M 50/561; H01M 2220/20; H01M 2220/30
(Continued)

(56) References Cited

U.S. PATENT DOCUMENTS 349,375 A * 9/1886 Takahashi ................ E04B 9/30
52/311.2
5,002,186 A 3/1991 Cooper
(Continued)

FOREIGN PATENT DOCUMENTS

| CN | 106025120 A | 10/2016 |
| CN | 205692889 U | 11/2016 |

(Continued)

OTHER PUBLICATIONS

Takasaki, Battery Pack, Translation, 2006.*
(Continued)

Primary Examiner — Matthew T Martin
Assistant Examiner — Paul Christian St Wyrough
(74) Attorney, Agent, or Firm — Morgan, Lewis & Bockius LLP

(57) ABSTRACT

A battery pack that protects an internal configuration from external impact and effectively prevents internal short circuit is disclosed. The battery pack includes a plurality of can type secondary batteries arranged to be laid down in a horizontal direction; a bus bar at least partially formed of an electrically conductive material to electrically connect the plurality of can type secondary batteries; at least one module case with an empty space formed inside to accommodate the plurality of can type secondary batteries; and an insulating tube configured to surround an outer wall of the module case and
(Continued)

having an outer surface on which a plurality of embossing structures with a part bulging in an outer direction are formed.

11 Claims, 11 Drawing Sheets

(51) Int. Cl.
　　　*H01M 50/552*　　　(2021.01)
　　　*H01M 50/262*　　　(2021.01)
　　　*H01M 50/213*　　　(2021.01)
　　　*H01M 50/271*　　　(2021.01)
(52) U.S. Cl.
　　　CPC ....... *H01M 50/262* (2021.01); *H01M 50/561* (2021.01); *H01M 50/271* (2021.01); *H01M 2220/20* (2013.01); *H01M 2220/30* (2013.01)
(58) Field of Classification Search
　　　USPC .......................................................... 429/99
　　　See application file for complete search history.

(56) References Cited

U.S. PATENT DOCUMENTS

| | | | |
|---|---|---|---|
| 2015/0064523 | A1 | 3/2015 | Lim |
| 2016/0293915 | A1 | 10/2016 | Tsuchiya et al. |

FOREIGN PATENT DOCUMENTS

| | | | | |
|---|---|---|---|---|
| EP | 2439810 | A2 | | 4/2012 |
| JP | 7-37563 | A | | 2/1995 |
| JP | 2001-167747 | A | | 6/2001 |
| JP | 2006239588 | A | * | 9/2006 |
| JP | 2008-066000 | A | | 3/2008 |
| JP | 3176419 | U | | 6/2012 |
| JP | 5294697 | B2 | | 9/2013 |
| JP | 2013-218931 | A | | 10/2013 |
| JP | 5334362 | B2 | | 11/2013 |
| JP | 5334362 | B2 | * | 11/2013 ............. Y02E 60/10 |
| JP | 5334363 | B2 | | 11/2013 |
| JP | 2014011096 | A | | 1/2014 |
| JP | 6453013 | B2 | | 3/2014 |
| JP | 5478099 | B2 | | 4/2014 |
| JP | 5583538 | B2 | | 9/2014 |
| JP | 6098254 | B2 | | 3/2017 |
| KR | 20-0178684 | Y1 | | 4/2000 |
| KR | 10-2015-0125377 | A | | 11/2015 |
| KR | 10-2016-0098043 | A | | 8/2016 |
| KR | 10-2017-0046330 | A | | 5/2017 |
| KR | 20170046330 | A | * | 5/2017 |
| KR | 10-2017-0095070 | A | | 8/2017 |
| KR | 20170095070 | A | * | 8/2017 |
| KR | 10-2018-0054482 | A | | 5/2018 |
| WO | 2011/084728 | A1 | | 7/2011 |
| WO | 2013/078292 | A2 | | 5/2013 |

OTHER PUBLICATIONS

Moon, Battery Pack, Translation, 2017.*
Kwon, Secondary Battery Comprising Tube-Typed Member Containing Extinguishing Agents, Translation, 2017.*
Takasaki (translation) (Year: 2006).*
Moon (translation) (Year: 2017).*
Kwon (translation) (Year: 2017).*
Extended European Search Report dated Apr. 12, 2021, issued in corresponding European Patent Application No. 19908494.8.
International Search Report issued in corresponding International Patent Application No. PCT/KR2019/017601, dated Mar. 23, 2020.
Office Action dated Mar. 30, 2022 in related Chinese Patent Application No. 201980016314.1.

* cited by examiner

BATTERY PACK INCLUDING INSULATING TUBE

TECHNICAL FIELD

The present disclosure relates to a battery pack including an insulating tube, and more particularly, to a battery pack that protects internal components from external impact and effectively prevents an internal short circuit.

The present application claims priority to Korean Patent Application No. 10-2019-0003390 filed on Jan. 10, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active material and negative electrode active materials, respectively. The lithium secondary battery includes an electrode assembly in which a positive electrode plate and a negative electrode plate coated with a positive electrode active material and a negative electrode active material respectively are arranged with a separator interposed therebetween, and a sheath material, that is, a battery pouch sheath material, that seals and accommodates the assembly together with an electrolyte solution.

Recently, secondary batteries are widely used not only in small devices such as portable electronic devices but also in medium and large devices such as vehicles and energy storage systems. When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, recently, as a need for a large-capacity structure has been increased, including utilization as an energy storage source, a demand for a battery pack having a plurality of secondary batteries electrically connected in series and/or in parallel has increased.

In addition, it is common for such a battery pack to be provided with a pack housing formed of a metal material to protect a plurality of secondary batteries from external impact or accommodate and store the plurality of secondary batteries. However, when the external impact occurs, the shape of the pack housing formed of the metal material is deformed, and a part of the pack housing collides or contacts an internal configuration (a bus bar, a secondary battery, etc.) at a strong force, an internal short circuit is likely to occur. Accordingly, there was a problem in that secondary accidents such as explosion or fire of the secondary battery occurred.

DISCLOSURE

Technical Problem

The present disclosure is designed to solve the problems of the related art, and therefore the present disclosure is directed to providing a battery pack that protects internal components from external impact and effectively prevents an internal short circuit.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including a plurality of can type secondary batteries arranged to be laid down in a horizontal direction; a bus bar at least partially formed of an electrically conductive material to electrically connect the plurality of can type secondary batteries; at least one module case with an empty space formed inside to accommodate the plurality of can type secondary batteries; and an insulating tube configured to surround an outer wall of the module case and having an outer surface on which a plurality of embossing structures each having a part bulging in an outer direction are formed.

The battery pack may further include a pack housing having a box shape in which an inner space is formed to accommodate the module case coated with the insulating tube and having an inner surface contacting the embossing structures of the insulating tube.

An engraving structure having a shape indented in an inner direction in a size corresponding to each of the embossing structures may be formed in an inner surface of the pack housing.

An opening that is perforated from an inside to an outside may be formed in the insulating tube.

The battery pack may further include a fastening bolt configured to constrain the pack housing and the module case to each other.

An insertion hole that is perforated such that the fastening bolt is inserted may be formed in the pack housing.

A fastening groove into which the fastening bolt is inserted and fixed may be formed in a position corresponding to the insertion hole of the module case.

A through opening that is perforated such that the fastening bolt penetrates may be formed in the insulating tube.

The module case may include a first case in which an empty space is formed to accommodate the plurality of can type secondary batteries, and a second case coupled to one side of the first case in a horizontal direction and in which an empty space is formed to accommodate the plurality of can type secondary batteries.

The insulating tube may include a heat shrinkable material that is heat shrunk such that the first case and the second case are tightly fixed to each other.

The insulating tube may include a band portion formed in a part corresponding to a position between the first case and the second case, formed to have a greater thickness than other parts of the insulating tube, and extending in a band shape to surround an outside of the module case.

An embossing structure each having a part bulging in an inner direction may be formed in the inner surface of the insulating tube.

In another aspect of the present disclosure, there is provided an electronic device including the at least one battery pack.

In another aspect of the present disclosure, there is provided a vehicle including the at least one battery pack.

Advantageous Effects

According to an aspect of the present disclosure, the present disclosure is provided with an insulating tube configured to surround an outer wall of a module case, thereby preventing a contact between a bus bar provided inside and an external component or an external material of electrical conductivity (an electric short circuit) from occurring. That is, it is possible to prevent an accident from occurring due to leakage of a battery pack. In addition, when the battery pack is disassembled due to the accident, the insulating tube may prevent internal components from contacting each other to cause a short circuit, thereby increasing the safety of the battery pack.

In addition, according to an aspect of an embodiment of the present disclosure, the insulating tube is formed to have a plurality of embossing structures, and thus it is possible to effectively absorb external impact, and minimizing the impact on the internal components accommodated therein, thereby effectively increasing the safety and durability of the battery pack.

Moreover, according to an aspect of the embodiment of the present disclosure, a pack housing is configured to contact the embossing structure of the insulating tube on the inner surface, and thus heat generated due to charging and discharging of a plurality of secondary batteries, which are internal components may effectively conduct even the module case, the insulating tube and the pack housing, thereby effectively increasing the cooling efficiency of the battery pack.

In addition, according to one aspect of the present disclosure, the present disclosure is provided with a fastening bolt, an insertion hole, a fastening groove, and a through opening, such that the pack housing and the module case may be fixed to each other, and thus configurations embedded inside the pack housing do not easily shaking to the external impact, thereby preventing internal components from being damaged due to frequent shaking. Accordingly, the durability of the battery pack may be effectively increased.

Further, according to an aspect of the present disclosure, the insulating tube is provided with a heat shrinkable material that is heat shrunk such that a first case and a second case are tightly fixed to each other, and thus the outer surface of the module case may be tightly fixed in the inner direction, thereby coupling and fixing the first case and the second case to each other. That is, the first case and the second case may be coupled and fixed to each other only by heat shrinking the insulating tube without a separate coupling member of the first case and the second case of the module case. Accordingly, it is possible to reduce the manufacturing cost of the battery pack and achieve lightweight.

In addition, according to an aspect of the present disclosure, a band portion that is relatively thick is formed in a part of the insulating tube corresponding to a position between the first case and the second case, thereby effectively preventing the part of the insulating tube corresponding to the position between the first case and the second case that is relatively vulnerable from being damaged. Accordingly, the durability of the battery pack may be further improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
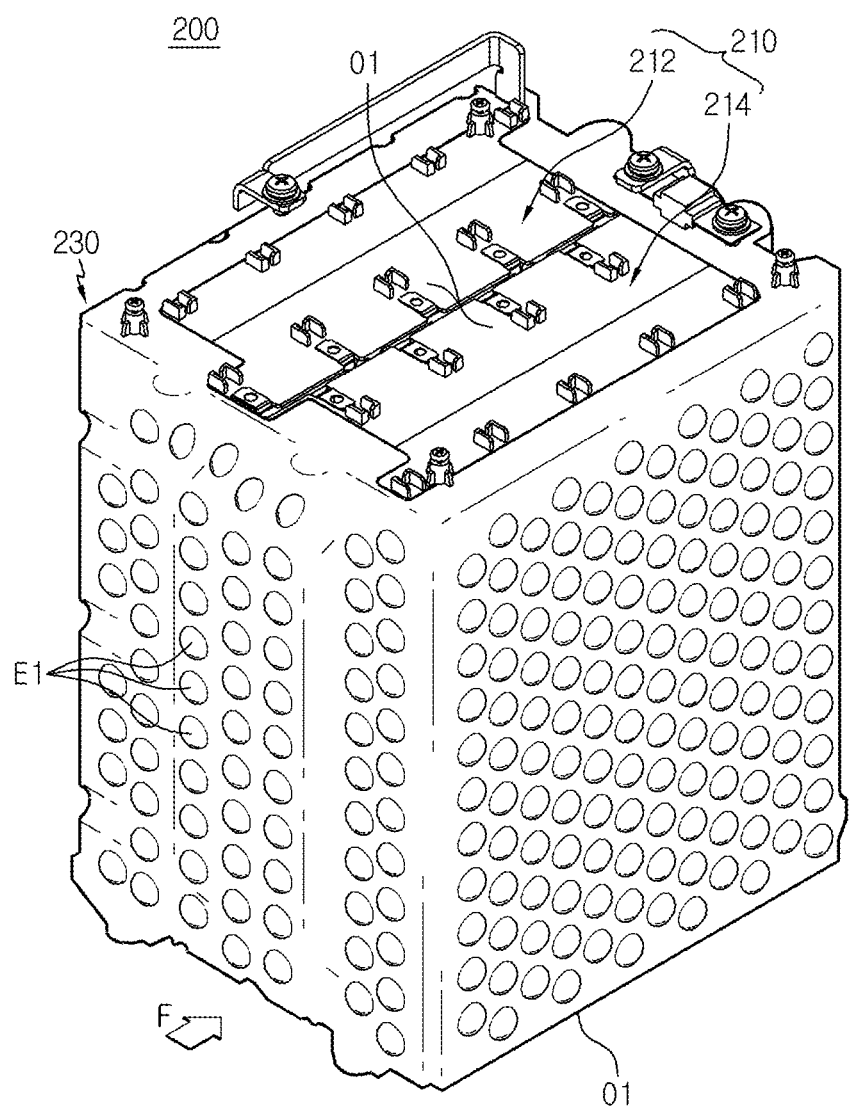
FIG. 1 is a perspective view schematically showing a battery pack according to an embodiment of the present disclosure.
Figure 2:
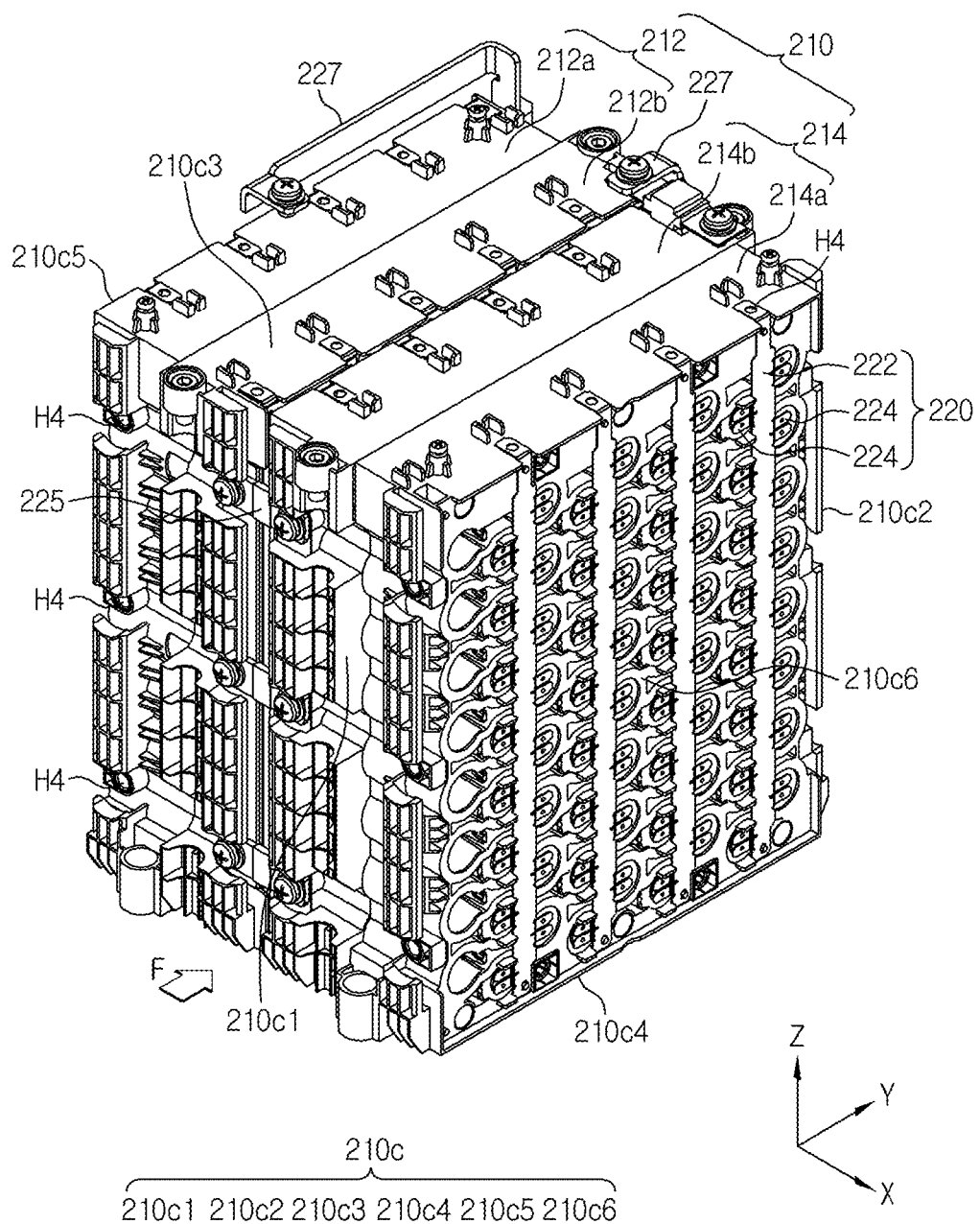
FIG. 2 is a perspective view schematically showing some components of the battery pack according to an embodiment of the present disclosure.
Figure 3:
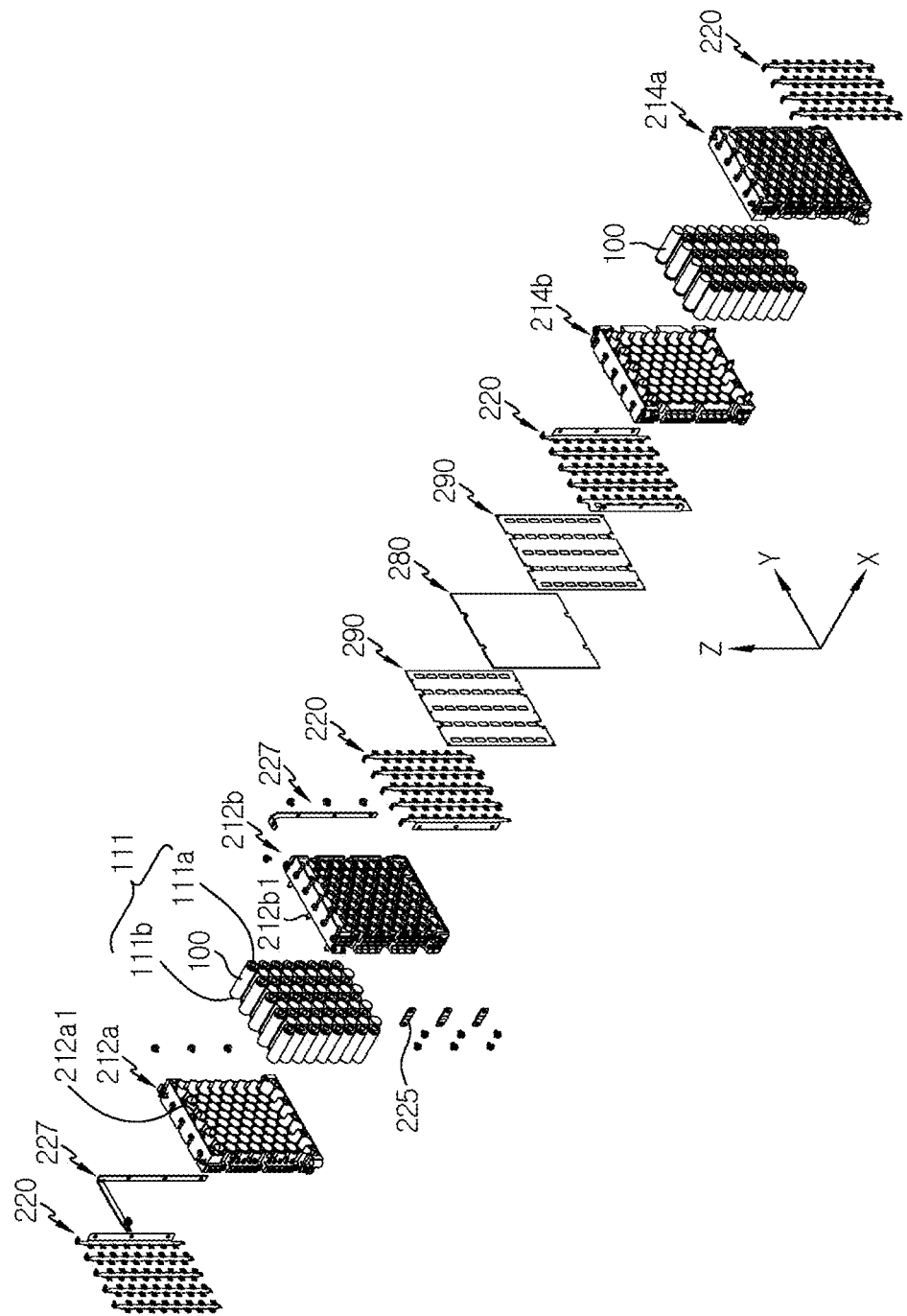
FIG. 3 is an exploded perspective view schematically showing some separated components of the battery pack according to an embodiment of the present disclosure.
Figure 4:
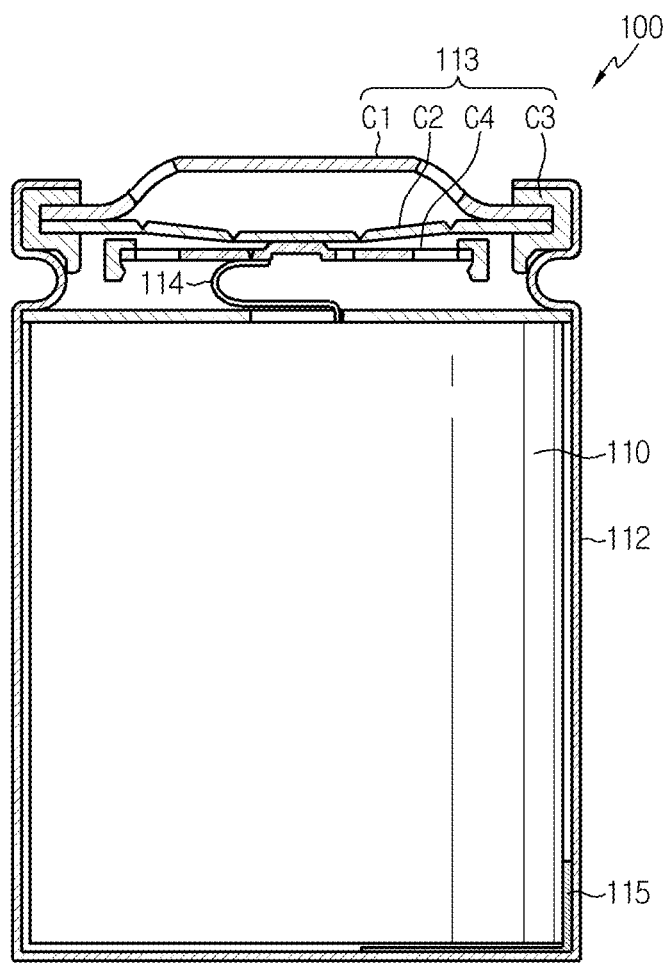
FIG. 4 is a cross-sectional view schematically showing the configuration of a can type secondary battery according to an embodiment of the present disclosure.

FIG. 1 is a perspective view schematically showing a battery pack according to an embodiment of the present disclosure. FIG. 2 is a perspective view schematically showing some components of the battery pack according to an embodiment of the present disclosure. FIG. 3 is an exploded perspective view schematically showing some separated components of the battery pack according to an embodiment of the present disclosure. In addition, FIG. 4 is a cross-sectional view schematically showing the configuration of a can type secondary battery according to an embodiment of the present disclosure.

Referring to FIGS. 1 to 4, the battery pack 200 according to an embodiment of the present disclosure may include a plurality of can type secondary batteries 100, a bus bar 220, a module case 210, and an insulating tube 230.

Here, the can type secondary battery 100 may include an electrode assembly 110, a battery can 112, and a cap assembly 113.

The electrode assembly 110 may have a structure wound with a separator interposed between a positive electrode plate and a negative electrode plate, a positive electrode tab 114 is attached to the positive electrode plate and connected to the cap assembly 113, and a negative electrode tab 115 is attached to the negative electrode plate and connected to the bottom end of the battery can 112.

The battery can 112 may have an empty space formed therein to accommodate the electrode assembly 110. In particular, the battery can 112 may has a cylindrical or square shape and may be configured with an open top end. In addition, the battery can 112 may be formed of a metal material such as steel or aluminum to secure rigidity and the like. In addition, the battery can 112 may has the bottom end to which the negative electrode tab is attached such that the lower portion of the battery can 112 and the battery can 112 may function as a negative electrode terminal.

The cap assembly 113 may be coupled to the top opening portion of the battery can 112 to seal the open end of the battery can 112. The cap assembly 113 may have a shape such as a circular shape or a square shape according to the shape of the battery can 112, and may include sub-components such as a top cap C1, a safety vent C2, and a gasket C3.

Here, the top cap C1 may be located on the uppermost portion of the cap assembly, may be configured to protrude in the upper direction. In particular, such a top cap C1 may function as a positive electrode terminal in the can type secondary battery 100. Accordingly, the top cap C1 may be electrically connected to another secondary battery 100, a load, or a charging device through an external device, such as a bus bar 220. The top cap C1 may be formed of, for example, a metal material such as stainless steel or aluminum.

The safety vent C2 may be configured to deform when the internal pressure of the secondary battery 100, that is, the internal pressure of the battery can 112, increases to a certain level or more. In addition, the gasket C3 may be formed of a material having electrical insulation such that the edge portions of the top cap C1 and the safety vent C2 may be insulated from the battery can 112.

Meanwhile, the cap assembly 113 may further include a current interrupt member C4. The current interrupt member C4 is also called a current interrupt device (CID). When the internal pressure of the battery increases due to gas generation, and the shape of the safety vent C2 is reversed, a contact between the safety vent C2 and the current interrupt member C4 is broken or the current interrupt member C4 is damaged, and thus the electrical connection between the safety vent C2 and the electrode assembly 110 may be blocked.

The configuration of such a can type secondary battery 100 is well known to those skilled in the art at the time of filing of the present disclosure, and thus a more detailed description thereof will be omitted. In addition, although an example of the can type secondary battery 100 is illustrated in FIG. 4, the battery pack 200 according to the present disclosure is not limited to the configuration of the specific can type secondary battery 100. That is, the various secondary batteries 100 known at the time of filing of the present disclosure may be employed in the battery pack 200 according to the present disclosure.

Moreover, the can type secondary battery 100 of FIG. 4 is illustrated with respect to the cylindrical secondary battery 100, but the square secondary battery 100 may be applied to the battery pack 200 according to the present disclosure.

Referring to FIG. 3 again, the plurality of can type secondary batteries 100 may be provided to be arranged in the front and back direction (Y direction) and the up and down direction (Z direction). For example, as illustrated in FIG. 3, the plurality of can type secondary batteries 100 may be configured to be arranged in the front and back direction. In addition, the plurality of can type secondary batteries 100 may be configured to be arranged in the up and down direction. Moreover, the plurality of can type secondary batteries 100 may be arranged in which portions formed as curved surfaces in a cylindrical battery can (112 in FIG. 4) face each other.

In particular, in the battery pack 200 according to the present disclosure, the plurality of can type secondary batteries 100 may be configured to be laid down in a horizontal direction. Here, the horizontal direction means a direction parallel to the ground. That is, as illustrated in FIG. 3, each can type secondary battery 100 may be configured to be elongated in a left and right direction (X-axis direction of the drawing). At this time, in some of the all can type secondary batteries 100, the positive electrode terminal 111a and the negative electrode terminal 111b may be located in the left and right directions, respectively. In addition, in the remaining can type secondary batteries 100, the positive electrode terminal 111a and the negative electrode terminal 111b of each can type secondary battery 100 may be located in the right and left directions, respectively.

Therefore, according to this configuration of the present disclosure, the height of the battery pack 200 may be configured to be low. That is, when the can type secondary battery 100 is laid down, the battery pack 200 having a height shorter than the length of the can type secondary battery 100 may be configured. Therefore, it is easy to design the battery pack 200 of a lower overall height.

Moreover, the bus bar 220 may electrically connect between the plurality of can type secondary batteries 100, such as all of the secondary batteries 100, or some of the secondary batteries 100. To this end, at least a part of the bus bar 220 may be formed of an electrically conductive material. For example, the bus bar 220 may be formed of a metal material such as copper, aluminum, nickel, or the like.

In particular, in the present disclosure, the bus bar 220, as shown in FIG. 1, may be provided with a body portion 222 and the connection portion 224.

The body portion 222 of the bus bar 220 may be configured in a plate shape. Moreover, the bus bar 220 may be configured in the form of a metal plate to ensure rigidity and electrical conductivity. In particular, the body portion 222 may be configured to be erected in the up and down direction (Z-axis direction of the drawing) along the electrode terminals 111 of the plurality of can type secondary batteries 100. That is, in the present disclosure, when the plurality of can type secondary batteries 100 are lengthily laid down in the left and right direction (X-axis direction of the drawing) and arranged in the front and back direction (Y-axis direction of the drawing) and/or the up and down direction (Z-axis direction of the drawing), the electrode terminals 111 of the various secondary batteries 100 may be configured to be arranged in parallel in the front and back direction and the up and down direction. At this time, the body portion 222 may be configured to be erected flat in the front and back direction or the up and down direction as a plate shape according to the arrangement direction of the electrode terminals 111 of the plurality of secondary batteries 100.

Moreover, the body portion 222 of the bus bar 220 may be configured to have an upper end portion bent in the inner direction. In addition, the upper end portion of the body portion 222 of the bus bar 220 may be a portion for sensing a voltage by a sensing member (not shown). In addition, a contact hole H4 for connection or contact of the sensing member may be formed in the bent portion of the bus bar 220. For example, as illustrated in FIG. 2, the upper end portion of the body portion 222 may be configured to be bent about 90 degrees toward the inner direction.

Specifically, the connection portion 224 may be configured to contact (join) the electrode terminals 111 of the plurality of can type secondary batteries 100 so as to electrically connect the plurality of can type secondary batteries 100. In addition, a plurality of the connection portions 224 may be formed to extend from the body portion 222 in the front and back direction (Y direction). For example, the connection portions 224 may contact the electrode terminals 111 of some secondary batteries 100 among all the secondary batteries 100 to electrically connect the plurality of secondary batteries 100.

Moreover, the connection portion 224 may contact the same polarity of the plurality of can type secondary batteries 100 and connect them in parallel. Alternatively, the connection portion 224 may contact and electrically connect the electrode terminals 111 of some secondary batteries 100 among all the secondary batteries 100.

In addition, the battery pack 200 may include a connection bus bar 225. Specifically, the connection bus bar 225 may be configured to electrically connect the two or more bus bars 220. For example, as shown in FIGS. 2 and 3, the battery pack 200 may be provided with three connection bus bars 225. The connection bus bar 225 may be configured such that one side is connected to one bus bar 220 and the other side is connected to another bus bar 220.

Furthermore, the battery pack 200 may include an external bus bar 227. Specifically, the external bus bar 227 may serve as a final external input/output electrical terminal of the battery pack 200. For example, as illustrated in FIG. 2, the battery pack 200 may be provided with two external bus bars 227 that serve as an external input/output positive electrode terminal and an external input/output negative electrode terminal.

In addition, the battery pack 200 may further include an internal plate 280 and an insulating sheet 290. Specifically, the internal plate 280 may be positioned to be interposed between the first case 212 and the second case 214. Moreover, when the plurality of can type secondary batteries 100 accommodated in the first case 212 fire or explode, the internal plate 280 may block the plurality of can type secondary batteries 100 accommodated in the second case 214 so as not to be affected by flame or gas.

In addition, the insulating sheet 290 may be configured to electrically insulate the bus bar 227 and the internal plate 280. Furthermore, the insulating sheet 290 may include an electrically insulating material. In addition, the insulating material may be, for example, a silicone-based polymer.

Meanwhile, referring back to FIG. 1, the battery pack 200 according to an embodiment of the present disclosure may be provided with at least one module case 210. Here, an empty space may be formed in the module case 210 to accommodate the plurality of can type secondary batteries 100. Specifically, the module case 210 may be provided with an outer wall 210c. The module case 210 may be provided with the outer wall 210c extending flat in the vertical direction or in the horizontal direction. In addition, when viewed in the F direction of FIG. 2, the outer wall 210c of the module case 210 may be provided with a first outer wall 210c1, a second outer wall 210c2, a third outer wall 210c3, a fourth outer wall 210c4, a fifth outer wall 210c5, and a sixth outer wall 210c6 that are formed in the front, back, up, down, left, and right directions to form the inner space.

Meanwhile, the terms indicating directions such as before, after, left, right, up and down described herein may vary depending on the position of an observer or the form in which an object is placed. However, in the present specification, for convenience of description, the directions of front, back, left, right, up, and down are identified and shown with respect to when viewed in the F direction.

For example, as shown in FIG. 2, the first outer wall 210c1, the second outer wall 210c2, the third outer wall 210c3, the fourth outer wall 210c4, the fifth outer wall 210c5, and the sixth outer wall 210c6 may be formed such that the front, back, upper, lower, left, and right surfaces of the module case 210 are connected to each other on a plane.

Accordingly, according to this configuration of the present disclosure, the module case 210 is provided with the outer wall 210c, thereby effectively protecting the plurality of secondary batteries 100 accommodated therein from external impact.

Referring back to FIGS. 1 and 2, the insulating tube 230 of the present disclosure may be configured to surround a part of the outer wall 210c of the module case 210. Specifically, the insulating tube 230 may have a tube shape with open upper and lower portions. More specifically, at least a part of the insulating tube 230 may have a shape corresponding to the outer shape of the module case 210. For example, as illustrated in FIG. 1, since the overall shape of the module case 210 is a rectangular parallelepiped, the insulating tube 230 may have a square tube shape in which an opening O1 is formed in the up and down direction. In addition, the insulating tube 230 may be configured to wholly surround the first outer wall 210c1, the second outer wall 210c2, the fifth outer wall 210c5, and the sixth outer wall 210c6, and may be configured to partially surround the remaining third outer wall 210c3 and fourth outer wall 210c4.

In addition, the insulating tube 230 may include at least a part of an electrically insulating material. For example, the electrically insulating material may be polymer plastic.

Therefore, according to this configuration of the present disclosure, the insulating tube 230 may prevent a contact (an electric short circuit) between the bus bar 220 provided therein and an external component or an external material of electrical conductivity, thereby preventing an accident caused by a short circuit from occurring. In addition, when the battery pack 200 is disassembled due to the accident, the insulating tube 230 may prevent internal components from contacting each other and causing the short circuit, thereby increasing the safety of the battery pack 200.

Referring back to FIG. 1, a plurality of embossing structures E1 each having a part bulging in the outer direction may be formed on the outer surface of the insulating tube 230. Specifically, when viewed from the F direction, the plurality of embossing structures E1 with a part bulging in the outer direction may be formed on one or more outer surfaces of a front side wall, a rear side wall, a left side wall, and a right side wall of the insulating tube 230.

In addition, the embossing structure E1 may be a part having a relatively greater thickness than the remaining parts where the embossing structure E1 of the insulating tube 230 is not formed. Furthermore, the embossing structure E1 may have a shape protruding in a hemisphere form from the outer surface of the insulating tube 230.

In another embodiment, the embossing structure E1 may include air inside and may be configured to have a high elasticity generally. Alternatively, the embossing structure E1 may include a material having the high elasticity, such as rubber, therein.

For example, as shown in FIG. 1, the plurality of embossing structures E1 having the relatively greater thickness in the outer direction than the remaining parts may be formed on the outer wall of the insulating tube 230.

Therefore, according to this configuration of the present disclosure, by forming the plurality of embossing structures E1, the insulating tube 230 may effectively absorb external impact and minimizing the impact on the internal components accommodated therein, thereby effectively increasing the safety and the durability of the battery pack 200.

Figure 5:
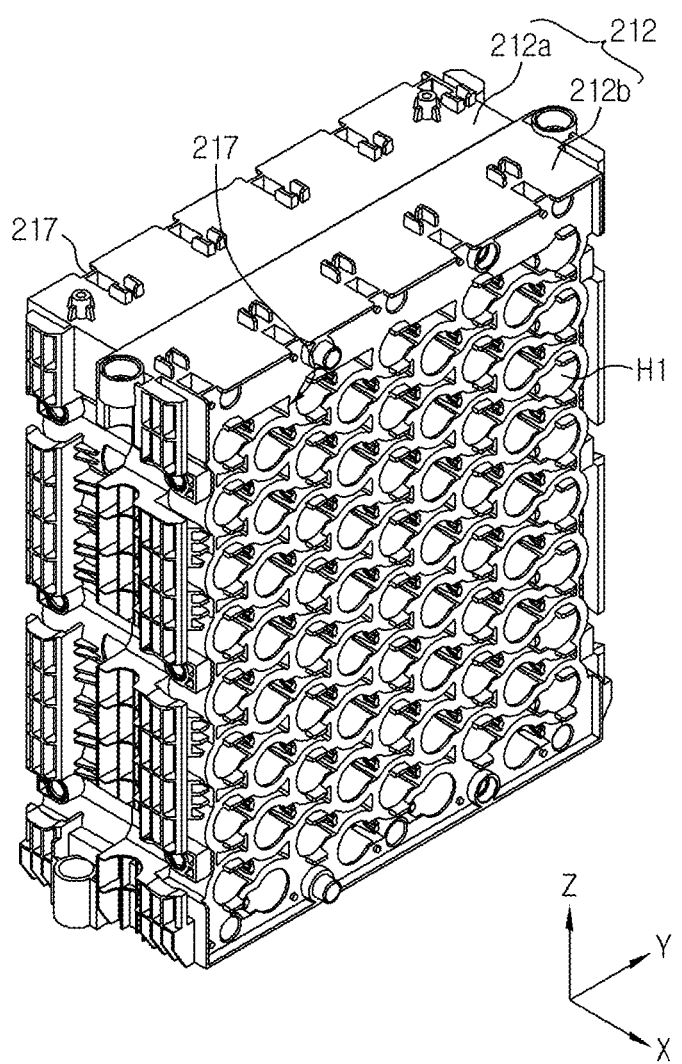
FIG. 5 is a perspective view schematically showing a first case which is a partial component of a battery pack according to an embodiment of the present disclosure.
Figure 6:
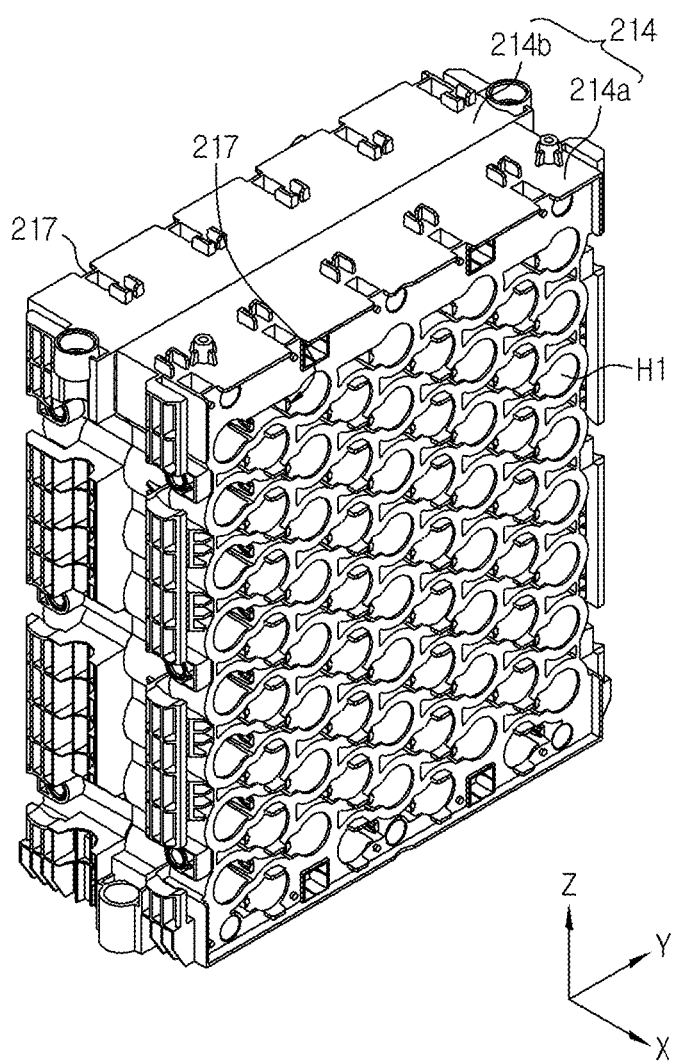
FIG. 6 is a perspective view schematically showing a second case which is a partial component of a battery pack according to an embodiment of the present disclosure.

FIG. 5 is a perspective view schematically showing a first case which is a partial component of a battery pack according to an embodiment of the present disclosure. FIG. 6 is a perspective view schematically showing a second case which is a partial component of a battery pack according to an embodiment of the present disclosure.

Referring to FIGS. 5 and 6 together with FIG. 2, the module case 210 may include a first case 212 and a second case 214.

Specifically, an empty space may be formed in the first case 212 such that the first case 212 may be configured to accommodate some of all the secondary batteries 100. In addition, an empty space may be formed in the second case 214 such that the second case 214 may be configured to accommodate the remnants of all the secondary batteries 100. Moreover, as shown in FIG. 2, each of the first case 212 and the second case 214 may be configured such that a space for accommodating each secondary battery 100 is separated from each other by a hollow H1. In addition, the hollow H1 may be configured to have the space for accommodating each secondary battery 100, as shown in FIG. 6.

Furthermore, the second case 214 may be configured to be coupled to one side of the first case 212 in the horizontal direction (X direction), as shown in FIG. 2. For example, the first case 212 and the second case 214 may be coupled to each other by a male and female coupling structure (not shown), or may be bolt fastened to each other (not shown). To the contrary, the first case 212 and the second case 214 may be connected to each other without a separate member for fixing each other.

A mounting portion 217 for mounting the bus bar 220 thereon may be formed in each of the first case 212 and the second case 214. Specifically, the mounting portion 217 may be provided on the left outer wall and the right outer wall of each of the first case 212 and the second case 214. For example, as illustrated in FIG. 3, the mounting portion 217 may be provided on the left and right outer walls of each of the first case 212 and the second case 214. A mounting space on which four bus bars 220 may be mounted may be formed in each of the mounting portions 217. In addition, the module case 210 may include at least a part of an electrically insulating polymer material. For example, the polymer material may be polyvinyl chloride.

Moreover, when the can type secondary battery 100 is a cylindrical secondary battery 100, in the first case 212 and the second case 214, the hollow H1 formed in the inner space may be configured in a cylindrical shape in which an accommodation space of the secondary battery 100 corresponds to the shape of the can type secondary battery 100.

More specifically, the hollow H1 of each of the first case 212 and the second case 214 may be configured to penetrate the module case 210 in the longitudinal direction (X-axis direction of the drawing) of the secondary battery 100. For example, the hollow H1 for accommodating the secondary battery 100 in the module case 210 is formed to penetrate in the left and right direction, and thus the electrode terminal 111 of the secondary battery 100 positioned inside the module case 210 may be configured to be exposed to the outside in the left and right direction of the module case 210. Therefore, in this case, the bus bar 220 positioned on the outside may be in direct contact with the electrode terminal 111 of the secondary battery 100 exposed to the outside.

In addition, the first case 212 may be provided with a first frame 212a and a second frame 212b. Here, the first frame 212a and the second frame 212b may be configured to meet and join each other in one side and the other side in the left and right direction (X direction). For example, as shown in FIG. 5, when viewed in the F direction of FIG. 1, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

In particular, the first frame 212a and the second frame 212b may be configured to cover one side and the other side of the plurality of secondary batteries 100, respectively, to wholly cover the outer surface of the can type secondary batteries 100. For example, when the can type secondary battery 100 is the cylindrical secondary battery 100, the first frame 212a and the second frame 212b wholly cover the outer surface of the cylindrical battery, such that the side surface of the secondary battery 100 in the up and down direction may be configured not to be exposed to the outside.

For example, in the configuration of FIG. 5, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

Therefore, according to this configuration of the present disclosure, since the side exposure of the secondary battery 100 is blocked by the module case 210, the insulating property of the secondary battery 100 may be improved, and the secondary battery 100 may be protected from external physical and chemical factors.

In addition, the second frame 212b may be configured to be connected to one side of the first frame 212a in the horizontal direction, as shown in FIG. 5. In addition, the first frame 212a and the second frame 212b may be fixed in a male and female coupling structure. For example, as shown in FIG. 2, a coupling groove 212a1 is formed in the first frame 212a, and a coupling protrusion 212b1 is formed on the second frame 212b and thus the coupling groove 212a1 and the coupling protrusion 212b1 may be coupled to each other.

Furthermore, the second case 214 may be provided with the first frame 214a and the second frame 214b. Here, when the first frame 214a and the second frame 214b are compared with the first frame 212a and the second frame 212b of the first case 212 described above, the first frame 214a and the second frame 214b may have the same configuration, except that the positions of the first frame 214a and the second frame 214b are reversely arranged. Specifically, when the front and rear positions of the second case 214 rotate by 180 degrees, the first frame 214a and the second frame 214b of the second case 214 may have the same arrangement as the first frame 212a and the second frame 212b of the first case 212.

Accordingly, the first frame 214a and the second frame 214b of the second case 214 have the same shapes as the first frame 212a and the second frame 212b of the first case 212, and thus detailed descriptions of the first frame 214a and the second frame 214b of the second case 214 will be omitted.

In addition, the bus bar 220 may be positioned on each of the outside and inside of the module case 210. Specifically, some of all the bus bars 220 may be configured to be mounted on the outsides (left and right outsides) of the first case 212 and the second case 214. The remaining bus bars 220 may be configured to be mounted on the inside between the first case 212 and the second case 214.

For example, as illustrated in FIG. 2, among the total of 16 bus bars, eight bus bars 220 may be mounted on the outside of each of the first case 212 and the second case 214. In addition, the remaining eight bus bars 220 may be mounted between the first case 212 and the second case 214.

Figure 7:
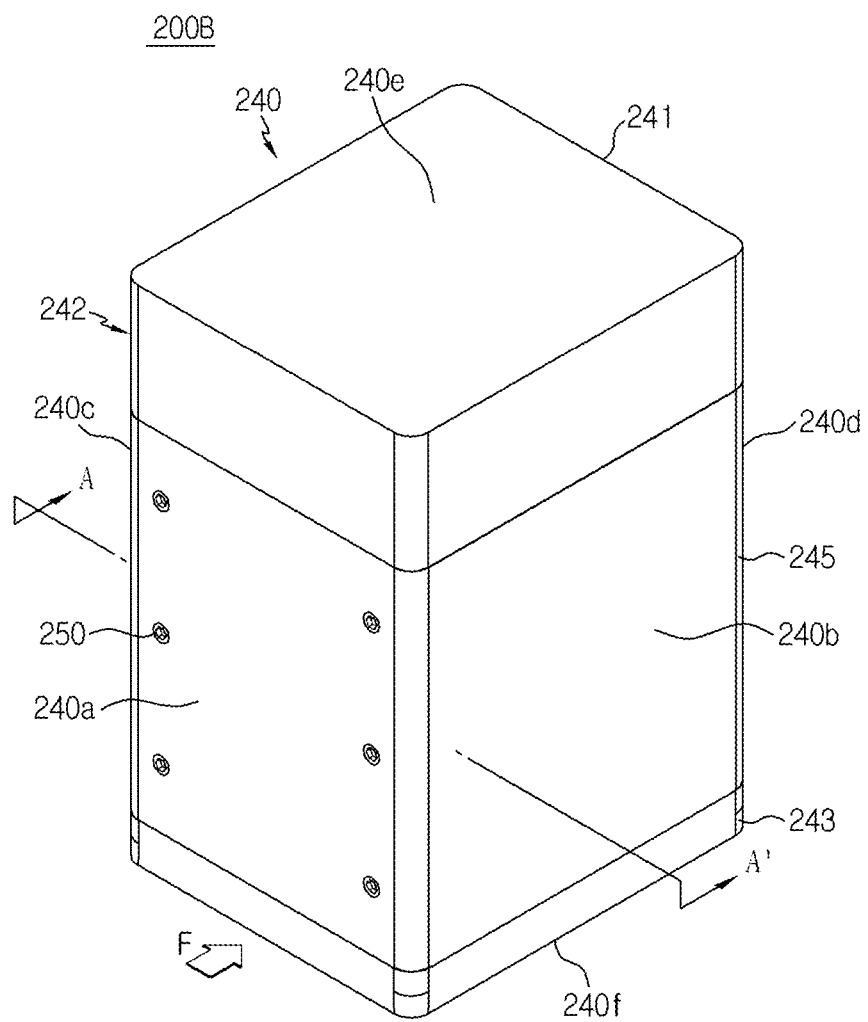
FIG. 7 is a perspective view schematically showing a pack housing which is a partial component of a battery pack according to another embodiment of the present disclosure.
Figure 8:
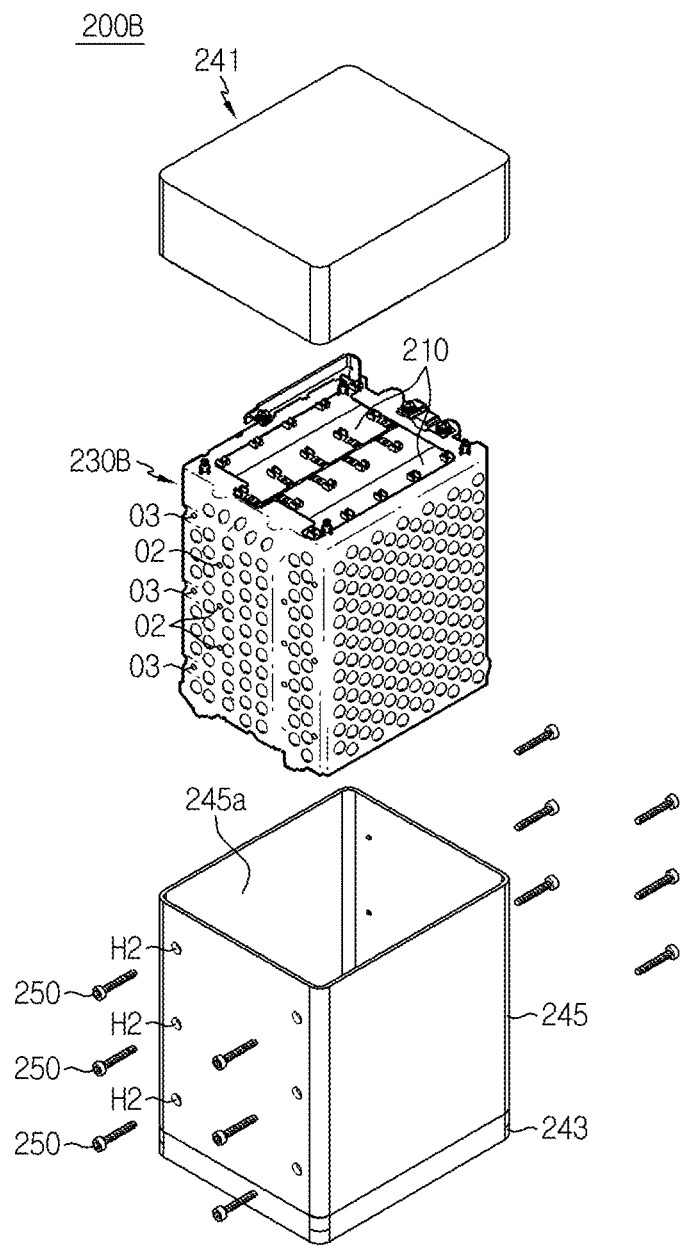
FIG. 8 is a perspective view schematically showing some components of the battery pack according to another embodiment of the present disclosure.

FIG. 7 is a perspective view schematically showing a pack housing which is a partial component of a battery pack according to another embodiment of the present disclosure. FIG. 8 is a perspective view schematically showing some components of the battery pack according to another embodiment of the present disclosure.

Referring to FIGS. 7 and 8 together with FIG. 2, the battery pack 200B according to another embodiment of the present disclosure may further include a pack housing 240.

Here, the pack housing 240 may have a box shape in which an inner space is formed to accommodate the module case 210 coated with the insulating tube 230B. Specifically, the pack housing 240 may be provided with an outer wall 242. Specifically, the outer wall 242 of the pack housing 240 may have six outer surfaces 240a, 240d, 240c, 240b, 240e, and 240f formed in front, rear, left, right, up, and down directions to form the inner space.

For example, as shown in FIG. 7, the pack housing 240 may be provided with the outer wall 242 having the six outer surfaces 240a, 240d, 240c, 240b, 240e, and 240f formed in the front, rear, left, right, up, and down directions.

Therefore, according to this configuration of the present disclosure, the pack housing 240 is provided with the outer wall having the six outer surfaces formed in the front, rear, left, right, up, and down directions, thereby effectively preventing the components accommodated therein from external impact.

In addition, the pack housing 240 may include an upper cap 241, an intermediate case 245, and a lower support portion 243. Specifically, the intermediate case 245 is coupled to the lower portion of the upper cap 241, and the lower support portion 243 may be coupled to the lower portion of the intermediate case 245. More specifically, the upper cap 241 may be formed to cover an upper portion of the module case 210 accommodated inside the pack housing 240. In addition, the intermediate case 245 may have a square tubular shape opened in the up and down direction. Further, the lower support portion 243 may be a box shape with an open upper portion and provided with a side wall and a lower wall.

Figure 9:
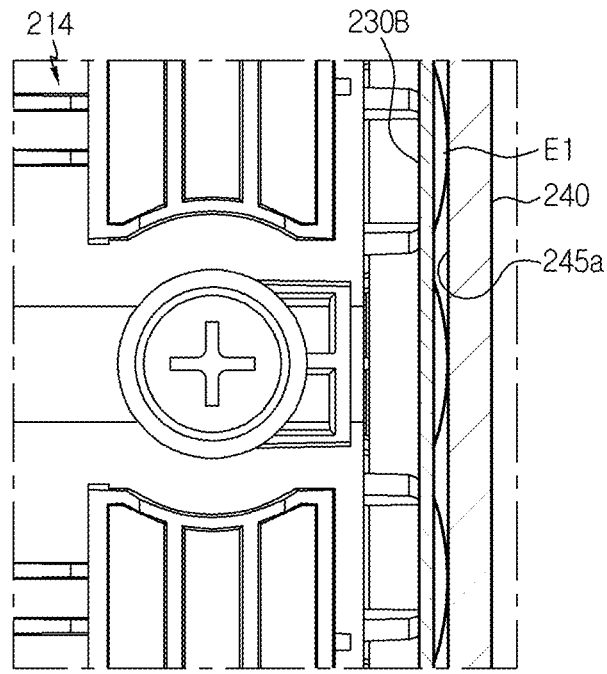
FIG. 9 is a partial side cross-sectional view schematically showing a part cut along the line A-A' in FIG. 7.

FIG. 9 is a partial side cross-sectional view schematically showing a part cut along the line A-A' in FIG. 7.

Referring again to FIG. 9 together with FIG. 8, an inner surface 245a of the pack housing 240 may be configured to contact the outer surface of the embossing structure E1 of the insulating tube 230. Specifically, when a plurality of embossing structures E1 are formed on the outer surface of the insulating tube 230, the outer surfaces of the plurality of embossing structures E1 may be in contact with the inner surfaces 245a of the pack housing 240.

For example, as illustrated in FIG. 9, the plurality of embossing structures E1 may be formed on a part of the insulating tube 230B positioned on the right side of the second case 214 of the battery pack 200B. In addition, the right outer surface of the embossing structure E1 may be configured to contact the right inner surface 245a of the inner space of the pack housing 240.

Therefore, according to this configuration of the present disclosure, the pack housing 240 is configured to contact the embossing structure E1 of the insulating tube 230B on the inner surface, and thus heat generated due to charging and discharging of the plurality of secondary batteries 100, which are internal components may effectively conduct even the module case 210, the insulating tube 230, and the pack housing 240, thereby effectively increasing the cooling efficiency of the battery pack 200B.

Figure 10:
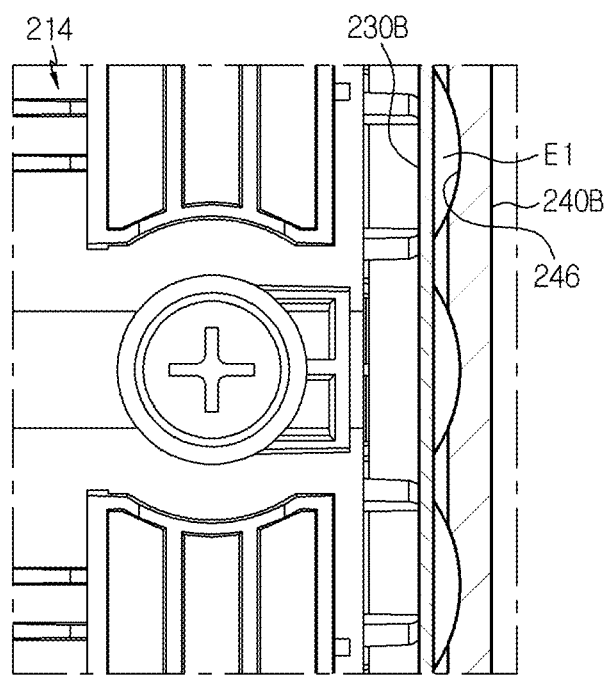
FIG. 10 is a partial side cross-sectional view schematically showing a cut part of a battery pack according to another embodiment of the present disclosure.

FIG. 10 is a partial side cross-sectional view schematically showing a cut part of a battery pack according to another embodiment of the present disclosure.

Referring back to FIG. 10 together with FIG. 8, a plurality of engraving structures 246 having a shape indented in the inner direction on the inner surface may be formed in the inner surface 245a of the pack housing 240B of the battery pack according to another embodiment of the present disclosure. Specifically, the engraving structure 246 may have a shape indented in a size corresponding to the embossing structure E1. That is, the engraving structure 246 may be formed in a position corresponding to the embossing structure E1 of the insulating tube 230B on the inner surface of the pack housing 240B. Moreover, a part of the embossing structure E1 of the insulating tube 230B may be inserted into and may contact the inner surface of the engraving structure 246.

Accordingly, according to this configuration of the present disclosure, the engraving structure 246 having the shape indented in the inner direction in the size corresponding to the embossing structure E1 is formed on the inner surface of the pack housing 240B, thereby effectively increasing a contact area of the embossing structure E1 and the inner surface of the pack housing 240B. Accordingly, when charging and discharging the battery pack, the efficiency of conducting heat generated inside to the pack housing 240B may be greatly increased. Moreover, when an external impact is applied to the pack housing 240B, the embossing structure E1 of the insulating tube 230B may absorb and disperse the external force to a wider area, thereby further improving the protection of the internal configuration against external impact.

Referring again to FIG. 8, an opening O2 that is perforated from the inside to the outside may be formed in the insulating tube 230B. Specifically, the opening O2 may be formed in a position facing an outer surface where insulation of the module case 210 is unnecessary. For example, as shown in FIG. 8, the opening O2 may be formed in a position corresponding to a front outer surface of the module case 210 where the bus bar 220 and the connection bus bar 225 are not located in the insulating tube 230B.

Therefore, according to this configuration of the present disclosure, by forming the opening O2 that is perforated from the inside to the outside in the insulating tube 230B, the battery pack 200B of the present disclosure may be configured to allow external and internal air of the insulating tube 230B to be movable such that there is no stagnant air therein. Accordingly, the cooling efficiency of the battery pack 200 may be effectively increased.

Referring to FIGS. 7 and 8 together with FIG. 1, the battery pack 200B may further include a fastening bolt 250 configured to restrain the pack housing 240 and the module case 210 from each other. In addition, an insertion hole H2 that is perforated may be formed in the intermediate case 245 of the pack housing 240 such that the fastening bolt 250 is inserted. Moreover, a fastening groove (H3 in FIG. 2) in which the fastening bolt 250 is inserted and fixed may be formed in a position corresponding to the insertion hole H2 of the module case 210. In addition, a through opening O3 that is perforated may be formed in the insulating tube 230B such that the fastening bolt 250 penetrates.

For example, as illustrated in FIG. 8, twelve fastening bolts 250 may be provided in the battery pack 200B of the present disclosure to restrain the pack housing 240 and the module case 210 from each other. In addition, twelve insertion holes H2 (some not shown) that are perforated may be formed in the front outer surface and the rear outer surface of the outer wall of the pack housing 240 such that the twelve fastening bolts 250 are inserted.

For example, as shown in FIG. 8, twelve fastening grooves (H3 in FIG. 2) into which the fastening bolt 250 is inserted and fixed may be formed in positions corresponding to the insertion holes H2 in the module case 210 of the present disclosure. In addition, the twelve through holes O3 that are perforated may be formed in positions corresponding to the twelve fastening grooves H3 in the insulating tube 230B such that the fastening bolt 250 penetrates and is inserted.

Therefore, according to this configuration of the present disclosure, the fastening bolt 250, the insertion hole H2, the fastening groove H3, and the through opening O3 are provided to fix the pack housing 240 and the module case 210 to each other, and thus configurations embedded inside the pack housing 240 do not easily shaking to the external impact, thereby preventing internal components from being damaged due to frequent shaking. Accordingly, the durability of the battery pack may be effectively increased.

Referring to FIG. 8 together with FIG. 2, the insulating tube 230B may have a heat shrunk form such that the first case 212 and the second case 214 are tightly fixed to each other. Specifically, the insulating tube 230B may have a shape shrunk by heat at a predetermined temperature. For example, a method of applying heat to the insulating tube 230B may use a dryer (a heater) to contact air of a predetermined temperature to the insulating tube 230B. Alternatively, radiant heat generated may be transferred to the insulating tube 230B through an external device.

In addition, at least a part of the insulating tube 230B may include a heat shrinkable material. The heat shrinkable material may be a material having the volume reduced at a specific temperature. For example, the heat shrinkable material may be manufactured using a polyester resin, a polyolefin resin or a polyphenylene sulfide resin. More specifically, the insulating tube 230B may include any one or more of polyvinyl chloride, polystyrene, polyethylene terephthalate (PET), polyolefin, nylon, polyvinyl chloride (PVC), and polybutylene terephthalate (PBT).

Therefore, according to this configuration of the present disclosure, the insulating tube 230B is provided with the heat shrinkable material that is heat shrunk such that the first case 212 and the second case 214 are tightly fixed to each other, thereby tightly fixing the outer surface of the module case 210 in the inner direction, and thus the first case 212 and the second case 214 may be coupled and fixed to each other. That is, even without a separate coupling member of the first case 212 and the second case 214 of the module case 210, the first case 212 and the second case 214 may be coupled and fixed to each other only by heat shrinking the insulating tube 230B. Accordingly, it is possible to reduce the manufacturing cost of the battery pack 200B and achieve lightweight.

Figure 11:
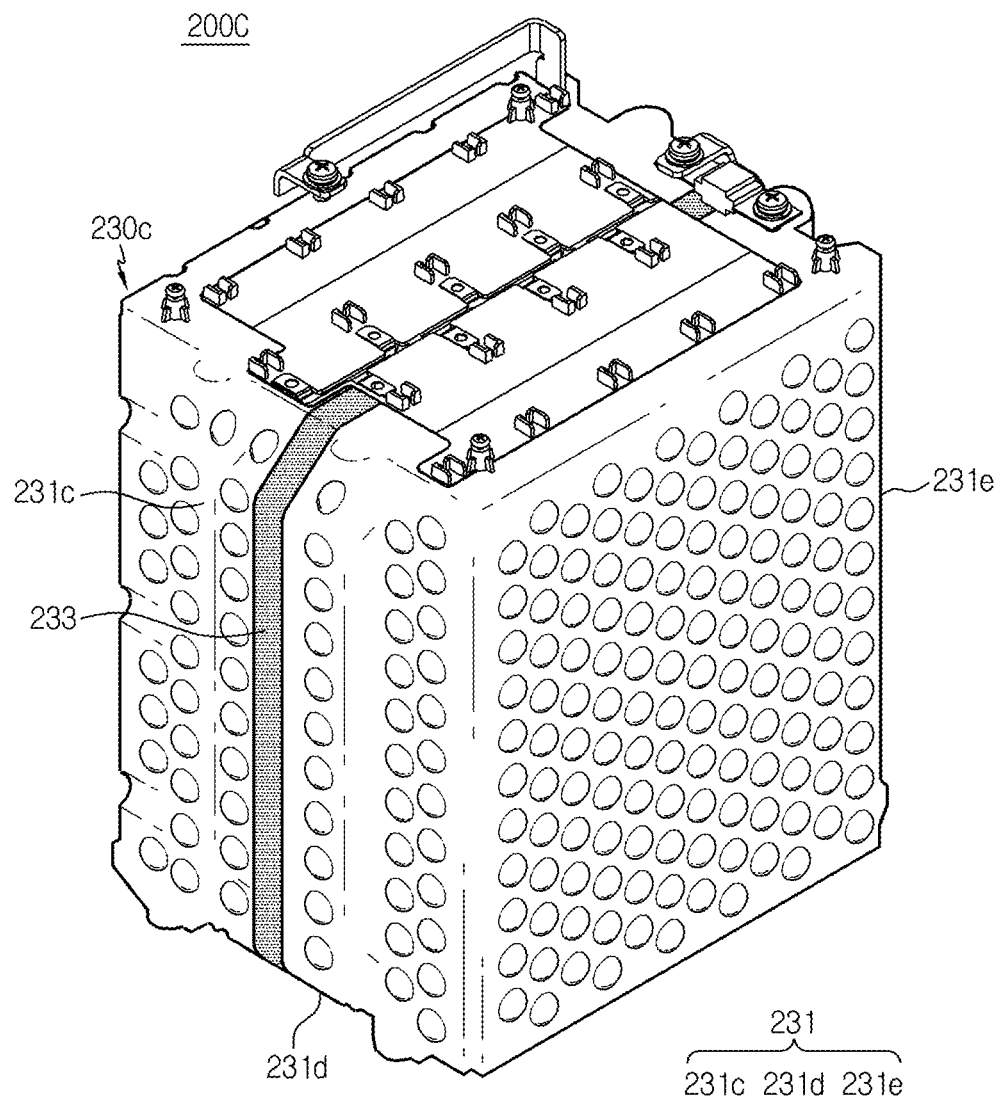
FIG. 11 is a perspective view schematically showing a battery pack according to another embodiment of the present disclosure.

FIG. 11 is a perspective view schematically showing a battery pack 200C according to another embodiment of the present disclosure.

Referring to FIG. 11, the insulating tube 230 may further include a band portion 233 extending in a band shape. Specifically, the band portion 233 may be formed in a part corresponding to a position between the first case 212 and the second case 214. In particular, the band portion 233 may be formed in the part corresponding to the position between the first case 212 and the second case 214 along the periphery of the outer wall 231 of the insulating tube 230 in the up and down direction.

For example, as illustrated in FIG. 11, the band portion 233 of the insulating tube 230 may be formed to extend in the center of the front outer wall 231c in the up and down direction, extend in the center of the lower outer wall 231d in the front and back direction, and extend in the center of the rear outer wall 213e in the up and down direction along the part corresponding to the position between the first case 212 and the second case 214.

In addition, the band portion 233 may be formed to have a greater thickness than other parts of the insulating tube 230. For example, the thickness of the band portion 233 may be formed to be 2 to 4 times greater than the remaining part where the embossing structure E1 of the insulating tube 230 is not formed. Moreover, the band portion 233 may be elongated to surround the outside of the module case 210.

Meanwhile, since the separated first case 212 and second case 214 are not configurations that are bound to each other, a force in which the first case 212 and the second case 214 are moved during an external impact may be generated. Accordingly, fatigue accumulation is intensified in the part corresponding to the position between the first case 212 and the second case 214 of the insulating tube 230 and damage or cracks are likely to occur.

Therefore, according to this configuration of the present disclosure, by forming the band portion 233 formed to be relatively thick in the part corresponding to the position between the first case 212 and the second case 214, the insulating tube 230 may effectively prevent a part of the insulating tube 230 corresponding to the position between the first case 212 and the second case 214 that is relatively vulnerable from being damaged. Accordingly, the durability of the battery pack 200 may be further improved.

Figure 12:
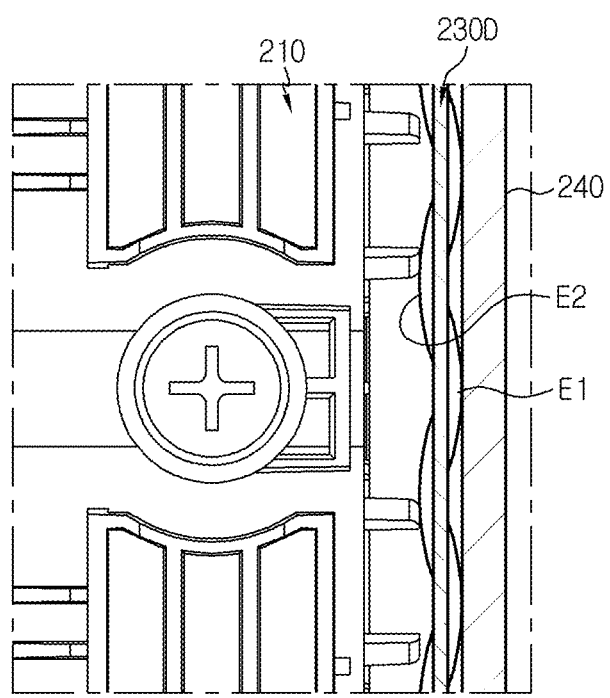
FIG. 12 is a partial side cross-sectional view schematically showing a cut part of a battery pack according to another embodiment of the present disclosure.

FIG. 12 is a partial side cross-sectional view schematically showing a cut part of a battery pack according to another embodiment of the present disclosure.

Referring to FIGS. 8 and 12, when compared to the insulating tube 230 of FIG. 9, an embossing structure E2 with a part bulging in the inner direction may be further formed on not only the outer surface but also the inner surface of the insulating tube 230D of FIG. 12.

For example, as illustrated in FIG. 12, a plurality of embossing structures E1 and E2 may be formed on each of the inner and outer surfaces of the insulating tube 230D. The outer surfaces of the plurality of embossing structures E2 in a bulging direction formed on the inner surface of the insulating tube 230D may be configured to contact the outer surface of the module case 210.

Accordingly, according to this configuration of the present disclosure, by forming the plurality of embossing structures E2 on the inner surface as well as the outer surface of the insulating tube 230D, an amount capable of absorbing (buffering) external impact may be further increased, thereby protecting the internal components more safely when the external impact is applied to the battery pack.

Meanwhile, the battery pack 200 may further include various devices (not shown) for controlling charging and discharging of the battery pack 200, for example, a battery management system (BMS), a current sensor, a fuse, etc.

Meanwhile, an electronic device (not shown) according to an embodiment of the present disclosure includes the at least one battery pack 200 described above. The electronic device may further include a device housing (not shown) provided with an accommodation space for accommodating the battery pack 200 and a display unit that allows a user to check a state of charging of the battery pack 200.

In addition, a battery pack according to an embodiment of the present disclosure may be included in a vehicle such as an electric vehicle or a hybrid vehicle. That is, a vehicle according to an embodiment of the present disclosure may be mounted with the battery pack 200 according to an embodiment of the present disclosure described above on a vehicle body.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS

| | |
|---|---|
| 200: battery pack | 100: can type secondary battery |
| 111, 111a, 111b: electrode terminal, positive electrode terminal, negative electrode terminal | |
| 210: module case | 212, 214: first case, second case |
| 212a, 214a: first frame | 212b, 214b: second frame |
| H1: hollow | |
| 220, 225, 227: bus bar, connection bus bar, external bus bar | |
| 230: insulating tube | E1, E2: embossing structure |
| 02, 03: opening, through opening | |
| 240: pack housing | 246: engraving structure |
| 250: fastening bolt groove | H2, H3: insertion hole, fastening |
| 233: band portion | |

INDUSTRIAL APPLICABILITY

The present disclosure relates to a battery pack including a plurality of can type secondary batteries. Further, the present disclosure is applicable to an industry related to an electronic device including the battery pack and a vehicle including the battery pack.

What is claimed is:

1. A battery pack comprising:
a plurality of can type secondary batteries arranged to be laid down in a horizontal direction;
a bus bar at least partially formed of an electrically conductive material to electrically connect the plurality of can type secondary batteries;
at least one module case with a space therein to accommodate the plurality of can type secondary batteries; and
an insulating tube configured to surround an outer wall of the module case and having an outer surface on which a plurality of outward direction embossing structures, each having a part protruding in an outward direction, are formed,
wherein the module case comprises:
a first case having an empty space to accommodate the plurality of can type secondary batteries; and
a second case coupled to one side of the first case in a horizontal direction and having an empty space to accommodate the plurality of can type secondary batteries,
wherein the insulating tube comprises a heat shrinkable material that is heat shrunk such that the first case and the second case are tightly fixed to each other,
wherein the insulating tube comprises a band portion extending in a band shape to surround an outside of the module case at a portion corresponding to a coupling interface between the first case and the second case where the outward embossing structures are absent, the band portion having a greater thickness than other parts of the insulating tube, and
wherein the insulating tube is provided to prevent a contact between the bus bar provided therein and an external component or an external material of electrical conductivity and wholly surrounds the outer walls of the module case on which the bus bars are provided.

2. The battery pack of claim 1, further comprising: a pack housing having a box shape with an inner space to accommodate the module case coated with the insulating tube and having an inner surface contacting the outward direction embossing structures of the insulating tube.

3. The battery pack of claim 2, wherein an engraving structure having a shape indented in an inner direction in a size corresponding to each of the outward direction embossing structures is defined in an inner surface of the pack housing.

4. The battery pack of claim 2, wherein an opening that is perforated from an inside to an outside is formed in the insulating tube.

5. The battery pack of claim 2, further comprising: a fastening bolt configured to constrain the pack housing and the module case to each other,
wherein the pack housing includes an insertion hole such that the fastening bolt is inserted into the insertion hole,
wherein the module case includes a fastening groove into which the fastening bolt is inserted and fixed, the fastening groove is at a position of the module case corresponding to the insertion hole, and
wherein the insulating tube includes a through opening that such that the fastening bolt is disposed through the through opening.

6. The battery pack of claim 1, wherein an inner direction embossing structure with a part bulging in an inner direction is defined in the inner surface of the insulating tube.

7. An electronic device comprising at least one battery pack of claim 1.

8. A vehicle comprising at least one battery pack of claim 1.

9. The battery pack of claim 1, wherein the band portion has a thickness 2-4 times greater than other parts of the insulating tube where the embossing structures are not formed, and
  wherein the band portion extends in an up-and-down direction to surround the outside of the module case at the portion corresponding to the coupling interface between the first case and the second case.

10. The battery pack of claim 1, wherein the protruding parts of the embossing structures has a hemisphere form protruding in an outward direction.

11. The battery pack of claim 1, wherein the band portion is formed along the periphery of an outer wall of the insulating tube in an up and down direction, and the band portion is formed to extend in a center of a front outer wall in the up and down direction, extend in a center of a lower outer wall in a front and back direction, and extend in a center of a rear outer wall in the up and down direction.

* * * * *